US010080168B2

(12) United States Patent
Hoffmann

(10) Patent No.: US 10,080,168 B2
(45) Date of Patent: Sep. 18, 2018

(54) HANDOVER IN SOFTWARE DEFINED NETWORKING

(71) Applicant: NOKIA SOLUTIONS AND NETWORKS GMBH & CO. KG, Munich (DE)

(72) Inventor: Klaus Hoffmann, Munich (DE)

(73) Assignee: NOKIA SOLUTIONS AND NETWORKS GMBH & CO. KG, Munich (DE)

( * ) Notice: Subject to any disclaimer, the term of this patent is extended or adjusted under 35 U.S.C. 154(b) by 6 days.

(21) Appl. No.: 15/106,111

(22) PCT Filed: Dec. 17, 2013

(86) PCT No.: PCT/EP2013/076855
§ 371 (c)(1),
(2) Date: Jun. 17, 2016

(87) PCT Pub. No.: WO2015/090363
PCT Pub. Date: Jun. 25, 2015

(65) Prior Publication Data
US 2016/0337914 A1 Nov. 17, 2016

(51) Int. Cl.
*H04W 36/00* (2009.01)
*H04W 76/27* (2018.01)
(Continued)

(52) U.S. Cl.
CPC ....... *H04W 36/0083* (2013.01); *H04W 24/10* (2013.01); *H04W 36/08* (2013.01); *H04W 76/27* (2018.02)

(58) Field of Classification Search
CPC . H04W 36/0083; H04W 24/10; H04W 36/08; H04W 76/046
See application file for complete search history.

(56) References Cited

U.S. PATENT DOCUMENTS

| 9,014,139 B2* | 4/2015 | Huang | H04W 36/02 370/331 |
| 2007/0254667 A1* | 11/2007 | Jokinen | H04W 36/12 455/436 |

(Continued)

FOREIGN PATENT DOCUMENTS

| KR | 2011-0071363 A | 6/2011 |
| WO | 2015/000516 A1 | 1/2016 |

OTHER PUBLICATIONS

International Search Report and Written Opinion for corresponding International Application No. PCT/EP2013/076855, dated Sep. 26, 2014.

(Continued)

*Primary Examiner* — Wutchung Chu
(74) *Attorney, Agent, or Firm* — Squire Patton Boggs (US) LLP

(57) ABSTRACT

Handover in software defined networking The present invention provides apparatuses, methods, computer programs, computer program products and computer-readable media usable for handover in software defined networking, for example X2 and/or S1-MME handover at source eNB and target eNB. The method includes requesting, by a first entity in a first plane, a first entity in a second plane to report a parameter to the first entity in the first plane, receiving, at the first entity in the first plane, the reported parameter, and forwarding, by the first entity in the first plane, the parameter to a second entity in the first plane.

20 Claims, 12 Drawing Sheets

(51) Int. Cl.
*H04W 24/10* (2009.01)
*H04W 36/08* (2009.01)

(56) References Cited

U.S. PATENT DOCUMENTS

| | | | | |
|---|---|---|---|---|
| 2007/0291695 | A1* | 12/2007 | Sammour | H04W 36/02 370/331 |
| 2009/0141684 | A1* | 6/2009 | Hashimoto | H04W 36/02 370/331 |
| 2009/0318127 | A1* | 12/2009 | Yi | H04L 1/1829 455/422.1 |
| 2010/0039996 | A1* | 2/2010 | Ohta | H04L 47/10 370/328 |
| 2010/0177739 | A1* | 7/2010 | Huang | H04W 36/02 370/331 |
| 2011/0105124 | A1* | 5/2011 | Hapsari | H04L 9/083 455/436 |
| 2012/0196603 | A1* | 8/2012 | Mochizuki | H04W 48/02 455/436 |
| 2013/0143566 | A1* | 6/2013 | Kubota | H04W 36/30 455/436 |
| 2013/0215822 | A1* | 8/2013 | Worrall | H04L 47/34 370/315 |
| 2013/0229942 | A1* | 9/2013 | Kubota | H04W 36/22 370/252 |
| 2013/0244659 | A1* | 9/2013 | Murasawa | H04W 36/34 455/436 |
| 2014/0064132 | A1* | 3/2014 | Liu | H04W 24/10 370/252 |
| 2014/0080449 | A1* | 3/2014 | Chen | H04W 12/04 455/411 |
| 2015/0131615 | A1* | 5/2015 | Miklos | H04W 36/0011 370/331 |
| 2015/0146688 | A1* | 5/2015 | Yasuda | H04W 36/0005 370/331 |
| 2015/0181493 | A1* | 6/2015 | Park | H04W 36/24 455/436 |
| 2015/0208283 | A1* | 7/2015 | Yang | H04W 36/04 370/331 |
| 2015/0245402 | A1* | 8/2015 | Mochizuki | H04W 76/025 370/331 |
| 2016/0037406 | A1* | 2/2016 | Centonza | H04W 36/04 370/332 |
| 2016/0095034 | A1* | 3/2016 | Hampel | H04W 36/14 370/331 |
| 2016/0255565 | A1* | 9/2016 | Kim | H04W 36/32 370/331 |

OTHER PUBLICATIONS

3GPP TS 36.300 V10.11.0 (Sep. 2013); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).
P. Gurusanthosh, et al.; "SDMA: A Semi-Distributed Mobility Anchoring in LTE Networks"; 2013 International Conference on Selected Topics in Mobile and Wireless Networking (MoWNeT); IEEE 2013; pp. 133-139.
Kostas Pentikousis, et al.; "MobileFlow: Toward Software-Defined Mobile Networks"; Future Carrier Networks; IEEE Communications Magazine; Jul. 2013; pp. 44-53.
3GPP TS 23.401 V12.2.0 (Sep. 2013); 3rd Generation Partnership Project; Technical Specification Group Services and System Aspects; General Packet Radio Service (GPRS) enhancements for Evolved Universal Terrestrial Radio Access Network (E-UTRAN) access (Release 12).
3GPP TS 25.467 V11.4.0 (Sep. 2013); 3rd Generation Partnership Project; Technical Specification Group Radio Access Network; UTRAN architecture for 3G Home Node B (HNB); Stage 2 (Release 11).
3GPP TS 29.281 V11.6.0 (Mar. 2013); 3rd Generation Partnership Project; Technical Specification Group Core Network and Terminals; General Packet Radio System (GPRS) Tunnelling Protocol User Plane (GTPv1-U) (Release 11).
3GPP TS 36.323 V11.2.0 (Mar. 2013); 3rd Generation Partnership Project; Technical Specification Group Radio Access Network; Evolved Universal Terrestrial Radio Access (E-UTRA); Packet Data Convergence Protocol (PDCP) specification (Release 11).
3GPP TS 36.413 V11.5.0 (Sep. 2013); 3rd Generation Partnership Project; Technical Specification Group Radio Access Network; Evolved Universal Terrestrial Radio Access Network (E-UTRAN); S1 Application Protocol (S1AP) (Release 11).
3GPP TS 36.423 V11.6.0 (Sep. 2013); 3rd Generation Partnership Project; Technical Specification Group Radio Access Network; Evolved Universal Terrestrial Radio Access Network (E-UTRAN); X2 application protocol (X2AP) (Release 11).
Notice to File a Response dated Nov. 28, 2017 corresponding to Korean Patent Application No. 10-2016-7019286.

* cited by examiner

HANDOVER IN SOFTWARE DEFINED NETWORKING

FIELD OF THE INVENTION

The present invention relates to apparatuses, methods, computer programs, computer program products and computer-readable media usable for handover in software defined networking.

BACKGROUND OF THE INVENTION

Mobile data transmission and data services are constantly making progress, wherein such services provide various communication services, such as voice, video, packet data, messaging, broadcast, etc. In recent years, Long Term Evolution LTE™ has been specified, which uses the Evolved Universal Terrestrial Radio Access Network E-UTRAN as radio communication architecture according to 3GPP specifications.

Furthermore, network virtualization is used in recent technologies, which splits the conventional networks into subsets to be used, operated and managed by different organizationally independent organizations. The use of network virtualization offers flexibility in the development of future network architectures.

The technical field according to the present invention is software defined networking (SDN, see ONF at https://www.opennetworking.org/index.php?option=com_content&view=category&layout=blog&id=41&Itemid=145&lang=en) for use e.g. in mobile telecommunication networks. Within the research of software defined networks SDN, a separation of the control plane and the user plane is discussed.

That is, in SDN, the system that makes decisions about where traffic is to be sent (control plane) is decoupled from the underlying systems that forward traffic to the selected destination (data plane).

Today, the eNB is an integrated monolithical entity which provides services to the 3GPP user equipment and mediates between the UE and the EPC (Evolved Packet Core). In order to provide the service, the eNB in general supports a control part and a user part. The user part of the eNB (eNB-U, eNB in user plane) in general forwards the payload to and from the user equipment towards/from the EPC. The control part of the eNB (eNB-C, eNB in control plane) in general covers the part which allows for the exchange of the signaling such that the UE and the EPC can request and grant particular services. In case of handover, there are the source and target eNBs involved, where source eNB denotes the eNB which the UE will leave, and where the target eNB is the one which receives the UE.

In the vertical control plane, a communication protocol is used, such as OpenFlow, FOrCES (Forwarding and Control Element Separation protocol), etc, for controlling the respective entities.

In case of OpenFlow, for example, the so called application rides on top of the OpenFlow controller (OFC, and is denoted as OFC+ to indicate that the controller is augmented with additional functionality).

In 3GPP specifications, the Intra E-UTRAN Access Mobility and S1 based handover (HO) is defined in TS 36.300 and TS 23.401. However, currently, the 3GPP specifications do not cover a solution in a SDN environment.

FIG. 1 shows an example of signaling in a case of an intra E-UTRAN handover of user equipment (UE) in the control plane, as shown in TS 36.300. A short explanation of the steps shown in FIG. 1 is given below. For details in this regard, reference is made to the description in TS 36.300.

In step 1, the source eNB (evolved NodeB) configures the UE measurement procedures according to the roaming and access restriction information.

In step 2, a MEASUREMENT REPORT is triggered and sent to the eNB.

In step 3, the source eNB makes decision based on MEASUREMENT REPORT and Radio Resource Management (RRM) information to hand off the UE.

In step 4, the source eNB issues a HANDOVER REQUEST message to the target eNB passing necessary information to prepare the HO at the target.

In step 5, an Admission Control may be performed by the target eNB.

In step 6, the target eNB prepares HO with L1/L2 and sends the HANDOVER REQUEST ACKNOWLEDGE to the source eNB.

In step 7, the source eNB sends the RRC message, i.e. RRCConnectionReconfiguration message including the mobilityControl Information, towards the UE.

In step 8, the source eNB sends the SN STATUS TRANSFER message to the target eNB to convey the uplink PDCP SN (packet data convergence protocol sequence number) receiver status and the downlink PDCP SN transmitter status of E-RABs (E-UTRAN Radio Access Bearer) for which PDCP status preservation applies.

After step 8, data forwarding is performed from the source eNB towards the target eNB.

In step 9, after receiving the RRCConnectionReconfiguration message including the mobilityControlInformation, UE performs synchronisation to target eNB and accesses the target cell via RACH (Random Access Channel).

In step 10, the target eNB responds with UL allocation and timing advance.

In step 11, When the UE has successfully accessed the target cell, the UE sends the RRCConnectionReconfigurationComplete message (C-RNTI, Cell Radio Network Temporary Identity) to confirm the handover, along with an uplink Buffer Status Report, whenever possible, to the target eNB to indicate that the handover procedure is completed for the UE.

In step 12, the target eNB sends a PATH SWITCH REQUEST message to MME (Mobility Management Entity) to inform that the UE has changed cell.

In step 13, the MME sends a MODIFY BEARER REQUEST message to the Serving Gateway (SGW).

In step 14, the Serving Gateway switches the downlink data path to the target side. The Serving gateway sends one or more "end marker" packets on the old path to the source eNB and then can release any U-plane/TNL (Transport Network Layer) resources towards the source eNB.

In step 15, the Serving Gateway sends a MODIFY BEARER RESPONSE message to MME.

In step 16, the MME confirms the PATH SWITCH REQUEST message with the PATH SWITCH REQUEST ACKNOWLEDGE message.

In step 17, by sending the UE CONTEXT RELEASE message, the target eNB informs success of HO to source eNB and triggers the release of resources by the source eNB. The target eNB sends this message after the PATH SWITCH REQUEST ACKNOWLEDGE message is received from the MME.

In step 18, upon reception of the UE CONTEXT RELEASE message, the source eNB can release radio and C-plane related resources associated to the UE context. Any ongoing data forwarding may continue.

According to FIG. 1, the Source eNB forwards the user plane data and the SN Status Transfer to the target eNB at least after the receipt of the handover request ack (cf. steps 6 and 8 in FIG. 1).

Further, according to FIG. 1, the target eNB forwards the user plane data to UE and the SGW at least after the receipt of the SN Status Transfer and the RRCConnectionReconfigurationComplete message (cf. steps 8 and/or 9 to 11 of FIG. 1).

However in the SDN environment, the OpenFlow protocol and/or the Forces protocol are not capable to support these features today.

That is, regarding the source eNB, in the SDN/OPENFLOW/Forces environment the source eNB Controller (or any other RAN (Radio Access Network) controller) currently cannot send the DL COUNT value and the UL COUNT value available at the eNB-U of the source eNB to the target eNB-C.

Further, regarding the target eNB, in the SDN/OPENFLOW/Forces environment the target eNB Controller (or any other RAN controller) currently cannot send the DL COUNT value and the UL COUNT value available at the eNB-C to the target eNB-U.

The DL and UL count is needed at the target eNB-U for correct synchronization of the packets.

Further, it is noted that according to current OpenFlow (OF) specifications, there are only three message which can be sent to the OF controller (i.e., Packet IN, Flow removed, Port status) but which per definition do not serve the needs for Handover.

For facilitating the understanding of the present description, the following is noted:
IP packets from the eNB towards the UE are sent via the PDCP protocol, and IP packets from the eNB towards the EPC (Evolved Packet Core) are sent via the GTP-U (GPRS Tunneling Protocol User Plane) protocol;
The PDCP PDU (Packet Data Unit) Number being carried over GTP-U (transferring the SN) is defined in chapter 5.2.2.2 of TS 29281;
The PDCP SN for the PDCP protocol is defined in chapter 6.2.4 of TS 36323;
The (UL and DL) COUNT Value transported via the SN Status transfer on the X2 Interface is defined in chapter 9.1.1.4 and chapter 9.2.15 of TS 36423.
The (UL and DL) COUNT Value transported via the MME/eNB Status transfer on the S1 Interface is defined in TS 36413.

SUMMARY OF THE INVENTION

It is therefore an object of the present invention to overcome the above mentioned problems and to provide apparatuses, methods, computer programs, computer program products and computer-readable media usable for handover in software defined networking, for example X2 and/or S1-MME handover at source eNB and target eNB.

According to an aspect of the present invention there is provided a method comprising:
requesting, by a first entity in a first plane, a first entity in a second plane to report a parameter to the first entity in the first plane,
receiving, at the first entity in the first plane, the reported parameter, and
forwarding, by the first entity in the first plane, the parameter to a second entity in the first plane.

According to another aspect of the present invention there is provided a method comprising:
receiving, at a first entity in a second plane, a request for reporting a parameter, and
forwarding the parameter to a first entity in a first plane.

According to another aspect of the present invention there is provided a method comprising:
receiving, at a second entity in a first plane, a message including a parameter,
retrieving the parameter from the received message, and
forwarding the retrieved parameter to a second entity in a second plane According to another aspect of the present invention there is provided a method comprising:
receiving, at a second entity in a second plane, a message including a parameter, and
storing the parameter.

According to another aspect of the present invention there is provided an apparatus, comprising:
at least one processor, and
at least one memory for storing instructions to be executed by the processor, wherein
the at least one memory and the instructions are configured to, with the at least one processor, cause the apparatus at least to perform:
requesting, at a first entity in a first plane, a first entity in a second plane to report a parameter to the first entity in the first plane,
receiving, at the first entity in the first plane, the reported parameter, and
forwarding, by the first entity in the first plane, the parameter to a second entity in the first plane.

According to another aspect of the present invention there is provided an apparatus, comprising:
at least one processor,
and
at least one memory for storing instructions to be executed by the processor, wherein
the at least one memory and the instructions are configured to, with the at least one processor, cause the apparatus at least to perform:
receiving, at a first entity in a second plane, a request for reporting a parameter, and
forwarding the parameter to a first entity in a first plane.

According to another aspect of the present invention there is provided an apparatus, comprising:
at least one processor,
and
at least one memory for storing instructions to be executed by the processor, wherein
the at least one memory and the instructions are configured to, with the at least one processor, cause the apparatus at least to perform:
receiving, at a second entity in a first plane, a message including a parameter,
retrieving the parameter from the received message, and
forwarding the retrieved parameter to a second entity in a second plane.

According to another aspect of the present invention there is provided an apparatus, comprising:
at least one processor,
and
at least one memory for storing instructions to be executed by the processor, wherein
the at least one memory and the instructions are configured to, with the at least one processor, cause the apparatus at least to perform:

receiving, at a second entity in a second plane, a message including a parameter, and storing the parameter.

According to another aspect of the present invention there is provided an apparatus, comprising:

means for requesting, at a first entity in a first plane, a first entity in a second plane to report a parameter to the first entity in the first plane, means for receiving, at the first entity in the first plane, the reported parameter, and means for forwarding, by the first entity in the first plane, the parameter to a second entity in the first plane.

According to another aspect of the present invention there is provided an apparatus, comprising:

means for receiving, at a first entity in a second plane, a request for reporting a parameter, and means for forwarding the parameter to a first entity in a first plane.

According to another aspect of the present invention there is provided an apparatus, comprising:

means for receiving, at a second entity in a first plane, a message including a parameter, means for retrieving the parameter from the received message, and means for forwarding the retrieved parameter to a second entity in a second plane.

According to another aspect of the present invention there is provided an apparatus, comprising:

means for receiving, at a second entity in a second plane, a message including a parameter, and means for storing the parameter.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

Further aspects and features according to example versions of the present invention are set out in the appending claims.

BRIEF DESCRIPTION OF THE DRAWINGS

These and other objects, features, details and advantages will become more fully apparent from the following detailed description of aspects/embodiments of the present invention which is to be taken in conjunction with the appended drawings, in which.

DESCRIPTION OF EXEMPLARY EMBODIMENTS

Exemplary aspects of the present invention will be described herein below. More specifically, exemplary aspects of the present invention are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

As already indicated above, the present invention generally relates to software defined networking SDN for use e.g. in mobile telecommunication networks.

Embodiments of the present invention address the problem of how to realize an eNB handover in SDN/OpenFlow environment. In the following, both the source eNB and the target eNB will be discussed.

Figure 1:
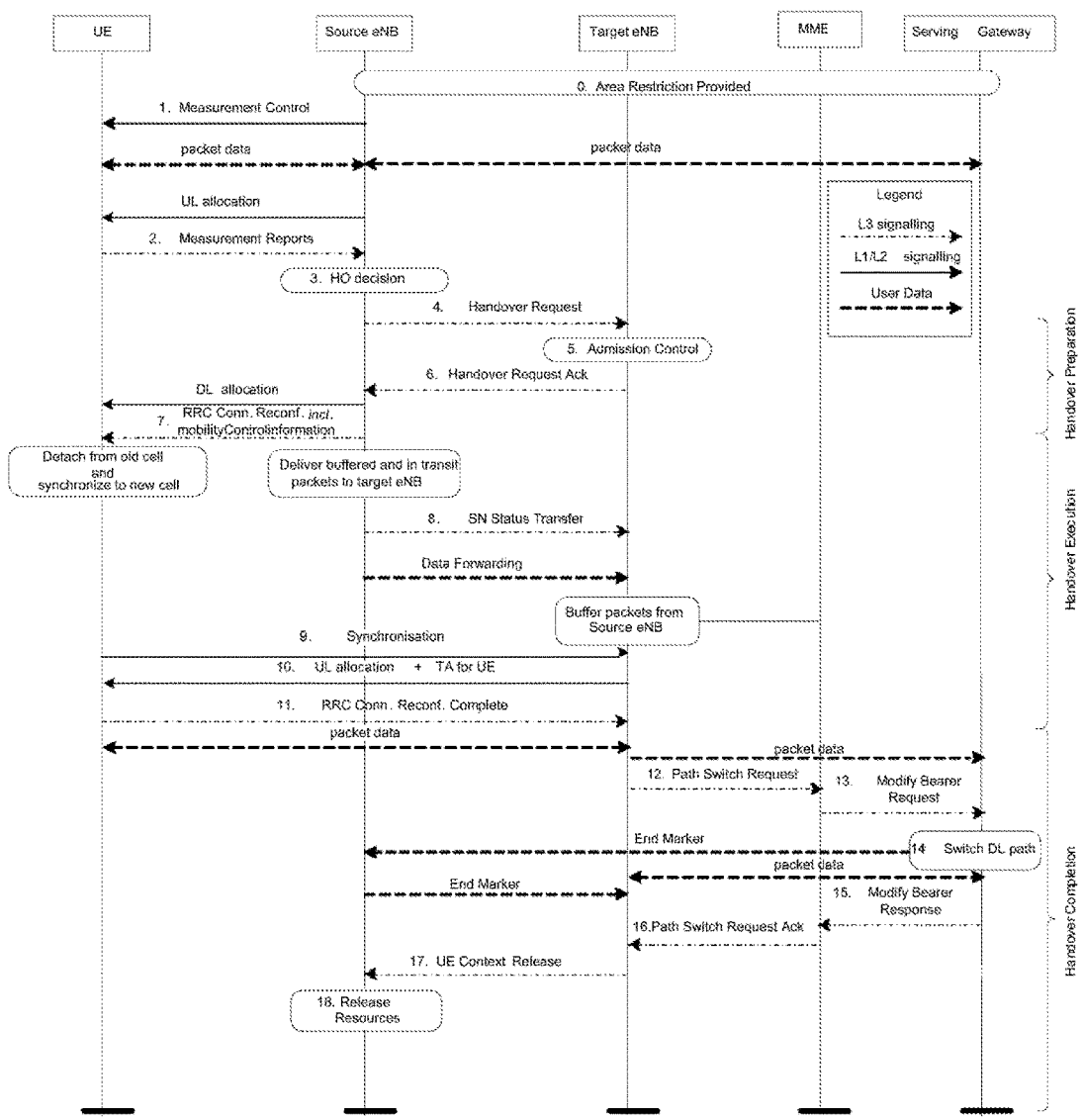
FIG. 1 is a signaling diagram illustrating an example of signaling in a case of an intra E-UTRAN handover of user equipment in the control plane.
Figure 2:
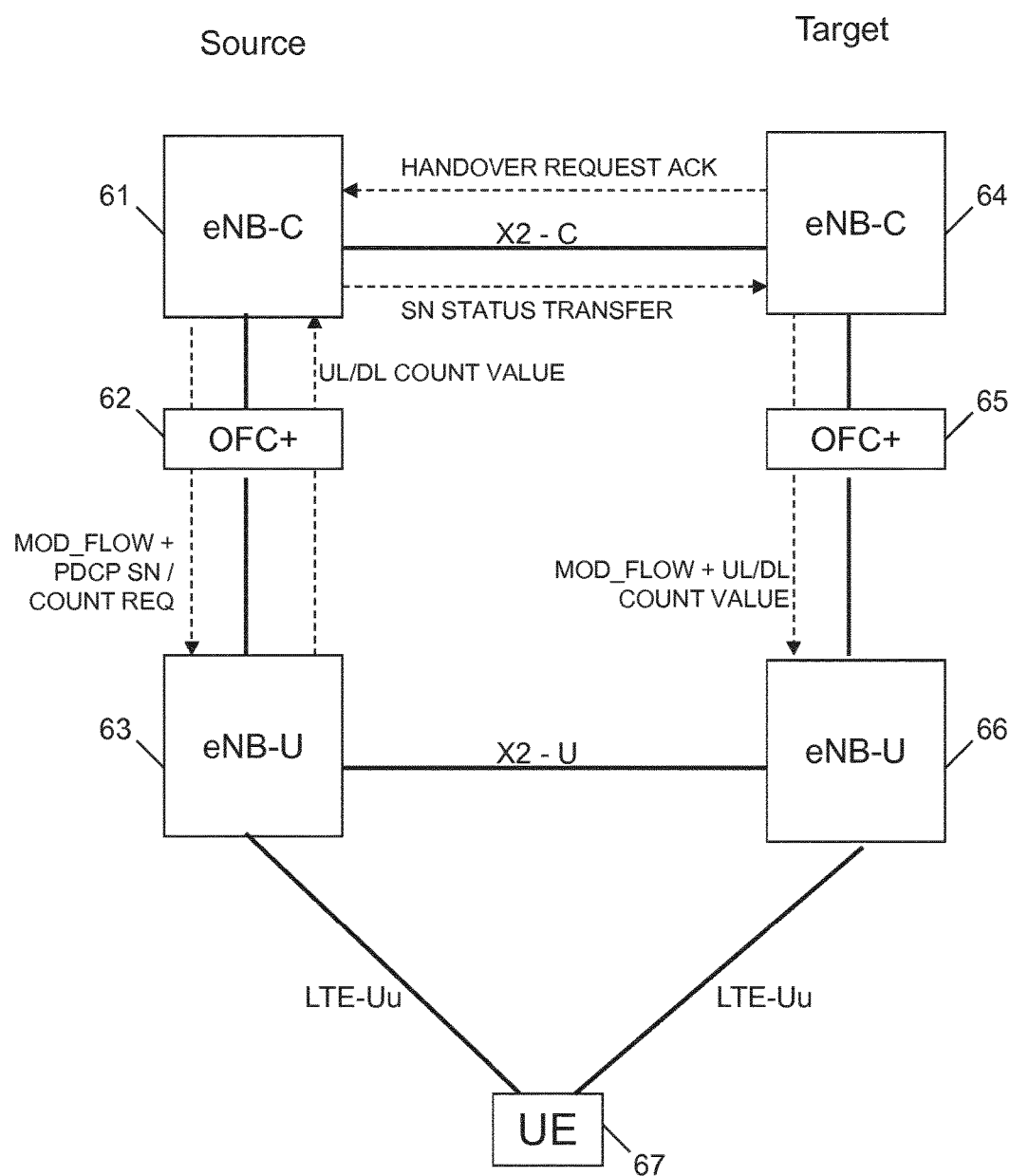
FIG. 2 is a diagram illustrating an example scenario to which certain embodiments of the present invention are applicable.

FIG. 2 shows an example scenario to which embodiments of the present invention are applicable.

It is of course to be noted that the embodiments of the present invention are not limited to the illustrated example scenario and that any other suitable number of UEs, eNBs, APs (Access Points), Base Stations and any suitable connections therebetween are conceivable.

According to FIG. 2, there are provided a source eNB-C 61 of the control plane and a source eNB-U 63 of the user plane. Further, there are provided target eNB-C 64 of the control plane and a target eNB-U 66 of the user plane. Between the respective eNB-Cs 61 and 64 and the respective eNB-Us 63 and 66, there are provided respective OpenFlow Controllers OFC+ 62 and 65 with additional functionality. The source eNB-C 61 and the target eNB-C 64 are connected via a X2-C interface. The source eNB-U 63 and the target eNB-U 66 are connected via a X2-U interface. Further, there is provided a user equipment UE 67 that is connected to the eNB-Us 63 and 66 via respective LTE-Uu interfaces. Further, the UE may be connected to the eNB-Cs 61 and 64 of the control plane via an LTE-Uu RRC interface, which is not shown in FIG. 2.

Source eNB

First, the behavior at the source eNB will be explained according to certain embodiments of the present invention.

In order to overcome the above mentioned problem, according to certain embodiments of the present invention, it is suggested that at least the so called UL Count and DL Count values as defined in the "eNB Status Transfer Transparent container" carried in the "eNB STATUS TRANSFER" and/or "MME STATUS TRANSFER" (cf., e.g. chapter 9.2.1.31 of 3GPP TS 36.413) are firstly requested by the eNB-C/OFC+ and mapped into a SDN enabling protocol, like for example OpenFlow or Forces, such that the separated user plane of the source eNB can report the UL and DL Count values to the source eNB control plane application once the data forwarding to the target eNB had been started or is about to start.

In general the same applies to the X2 based message called "SN Status transfer" sent from the source eNB to the target eNB (as defined in TS 36 423).

With the receipt of the handover Request ACK, as shown in FIG. 2, at the eNB-C, the eNB-C instructs the enB-U via the OFC+ with the OpenFlow Mod_Flow message to switch/redirect UL and DL packets destined/sourced to/from the UE to forward them to the target eNB.

Furthermore, the eNB-C requests the eNB-U to report the UL/DL count values to the eNB-C when the transmitter/receiver status is frozen, i.e. when it stopped (or when it will stop) assigning PDCP SNs to packets SDUs (Service Data Unit) for DL and stopped (or will stop) delivering UL packets towards the EPC.

Once the corresponding report of the UL/DL count value (either via an artificial OpenFlow "packet in" message in particular triggered by the redirection of this individual packets (and following packets) or a new proprietary OpenFlow message reporting the count values) is received at the eNB-C, the count values are inserted into the X2 SN Status transfer message and sent to the target eNB-C.

The important use case is the support of intra E-UTRAN handover, but the same solution can also be applied to the S1 based handover as well.

The same principles in general can be applied to any other RAN element, like those already known in the past, e.g. BTS, etc and/or the like, as well as those of the future like LTE-A and 5G etc.

Alternatively, according to certain embodiments of the present invention, the source eNB-C may request to send all packets or only the first packet from the user plane up to the control plane via some artificial "packet in" message. In such a case, the OpenFlow controller may be able to redirect the manipulated packets towards the new destination by itself.

It is admitted that this may require that the OpenFlow protocol needs to be modified such that the PDCP can be matched.

However, such an alternative solution would have impact on the OpenFlow control channel and the OpenFLow controller and control plane.

In the following, certain embodiments of the present invention will be described in detail with reference to FIGS. 3 to 6.

Figure 3:
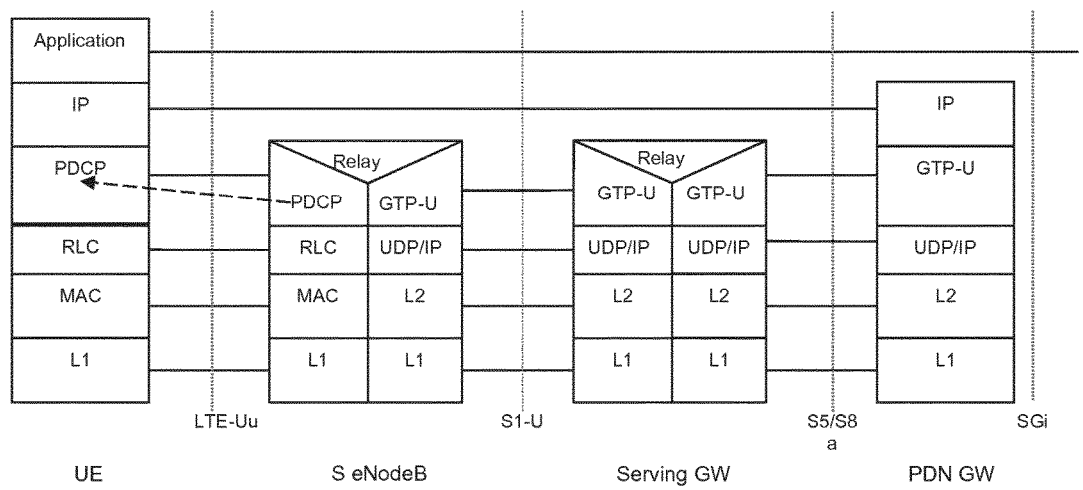
FIG. 3 is a diagram illustrating an example of the packet flow in downlink before the handover.

FIG. 3 illustrates an example of the packet flow in downlink in the user plane before the handover.

As shown in FIG. 3, before the handover, the source eNB is forwarding the PDCP packets only to the UE over the LTE-Uu interface.

Figure 4:
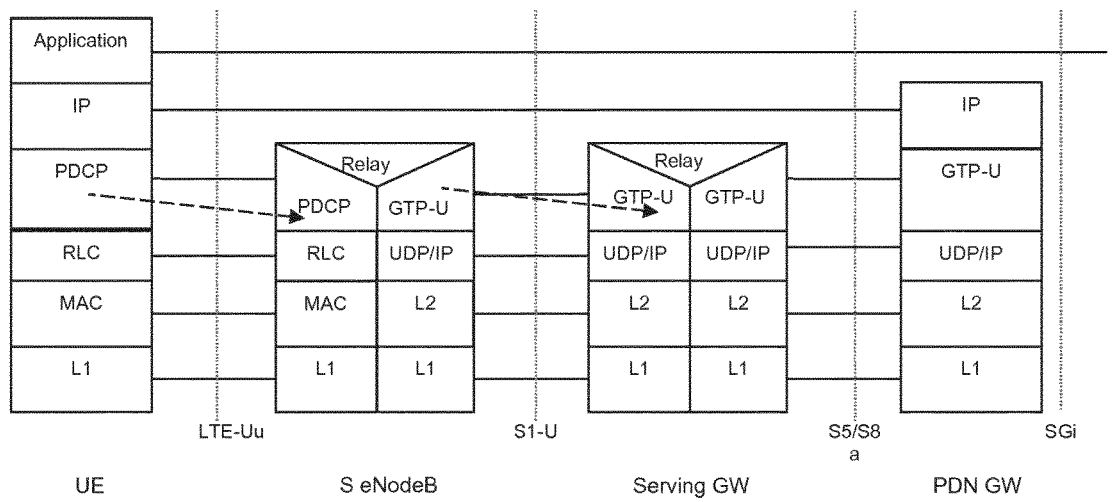
FIG. 4 is a diagram illustrating an example of the packet flow in uplink before the handover.

FIG. 4 illustrates an example of the packet flow in uplink in the user plane before the handover.

As shown in FIG. 4, before the handover, the source eNB is forwarding the GTP packets only to the SGW.

With the (or at least after the) receipt of the handover request ACK at the source eNB, the handover is started at the source eNB, as mentioned above.

Figure 5:
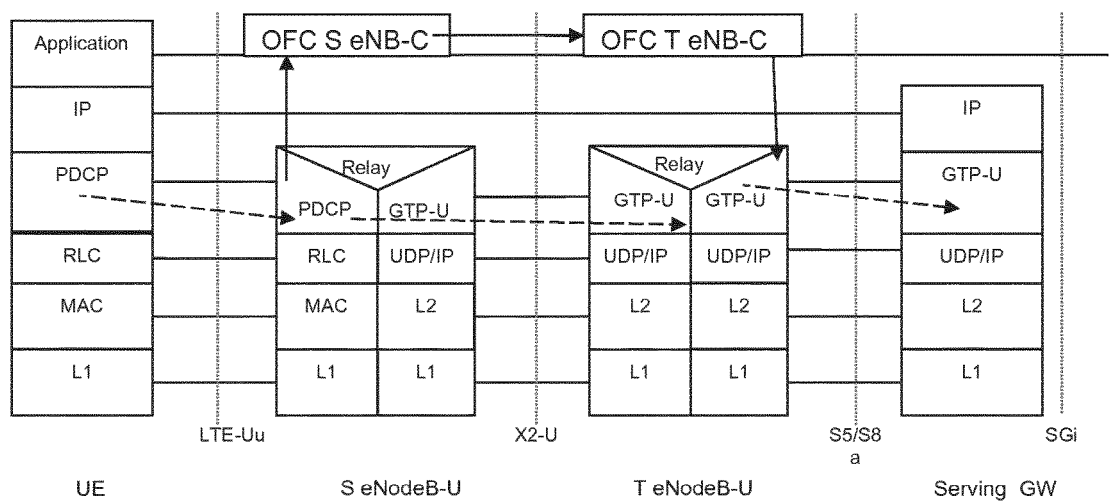
FIG. 5 is a diagram illustrating an example of the packet flow in uplink during handover according to certain embodiments of the present invention.

FIG. 5 shows an example of the packet flow in uplink during handover.

[Uplink]

As shown in FIG. 2 described above, the source eNB-C of the control plane instructs the source eNB-U of the user plane via the OFC+ to switch from sending of the GTP-U packets directly to the SGW to sending the GTP-U packets to the target eNB, as illustrated in FIG. 5, by inserting the new flag "Uplink switch over to target eNB" into the Openflow message "AddFlow" or "ModFlow".

This requires the S eNB-U to perform the following:

a) start sending the uplink GTP-U packets for a certain time period simultaneously to the target eNB and the SGW directly via S1-U interface, while assigning and inserting the PDCP SNs in the GTP-U extension "PDCP PDU Number" to the target eNB, b) then (after some time interval t) stop sending uplink packets directly towards the SGW, and simultaneously, stop assigning and inserting the PDCP SNs in the GTP-U extension "PDCP PDU Number" to the target eNB, and c) report/notify e.g. via an artificial OpenFlow message "Packet In" (but without allocating a buffer and buffer ID in the switch) to the OFC/eNB-C the first SN number which wasn't send across the S1-U interface and which wasn't inserted in the PDCP SNs in the GTP-U extension "PDCP PDU Number".

Thus, in that case, the source eNB-U reports the SN number to the OFC/eNB-C. The OFC/eNB-C in turn inserts this into the "SN Status transfer" or "eNB STATUS TRANSFER", which is sent to the target eNB-C (possibly via the MME).

Figure 6:
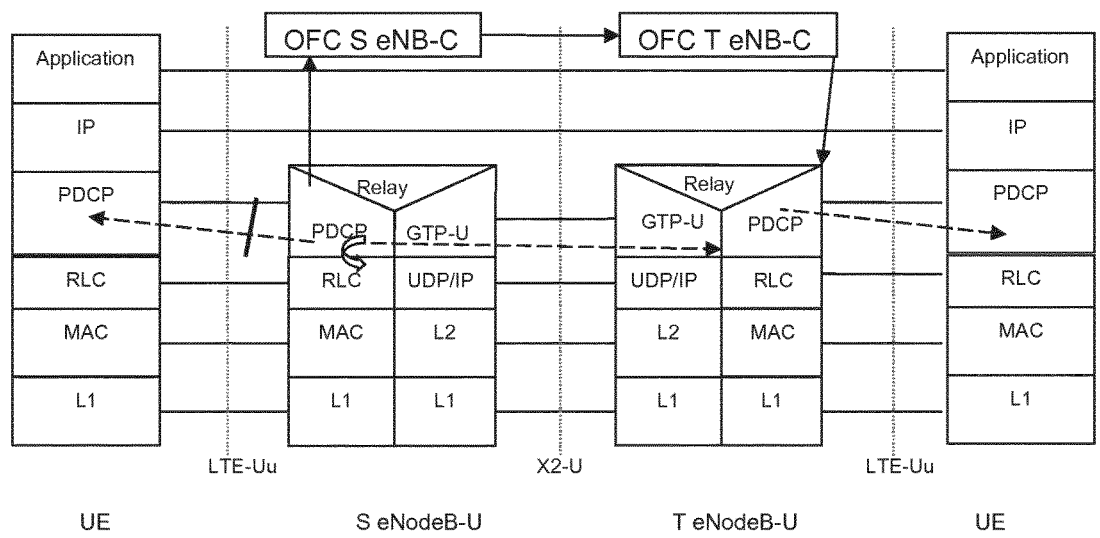
FIG. 6 is a diagram illustrating an example of the packet flow in downlink during handover according to certain embodiments of the present invention.

FIG. 6 illustrates an example of the packet flow in downlink during handover.

[Downlink]

The source eNB-C instructs the source eNB-U via the OFC+ to switch from sending of the PDCP packets directly to UE to sending the PDCP packets via the target eNB, as show in FIG. 6, by inserting the new flag "Down link switch over to target eNB" into the Openflow message "AddFlow" or "ModFlow".

This requires the S eNB-U to perform the following:
a) start sending the PDCP packets for a certain time period simultaneously to the target eNB and the UE directly via LTE-Ue interface, while assigning and inserting the PDCP SNs in the GTP-U extension "PDCP PDU Number",
b) Then stop sending down link packets directly towards the UE, and simultaneously stop assigning and inserting the PDCP SNs in the GTP-U extension "PDCP PDU Number", and
c) report/notify e.g. via an artificial OpenFlow message "Packet In" (but without allocating a buffer and buffer ID in the switch) to the OFC/eNB-C the first SN number which wasn't send across the LTE-Uu interface and which wasn't inserted in the PDCP SNs in the GTP-U extension "PDCP PDU Number".

Thus, in that case, the source eNB-U reports the SN number to the OFC/eNB-C. The OFC/eNB-C in turn inserts this into the "SN Status transfer" or "eNB STATUS TRANSFER", which is sent to the target eNB (possibly via the MME).

According to certain embodiments of the present invention, the following new OpenFlow actions and matches at the S-eNB are proposed.

As a new action, there is proposed pushing PDCP PDU with the SN to GTP-U (with length and content) at the source eNB-U (for UL and DL)

As a new match field, there is proposed reporting/notifying SN to the controller via e.g. an artificial OpenFlow "Packet In" (but without allocating a buffer and buffer ID in the switch), in case the PDCP is additionally redirected, e.g. the source eNB-U reports to the eNB-C/OpenFlow controller the SN from which on the packets are not sent anymore to the UE or the SGW, but to the target eNB.

Alternatively, as a new match field, there is proposed reporting/notifying SN to the controller in all following packets.

That is, as already mentioned above, the source eNB-C may request to send all packets or only the first packet_from the user plane up to the control plane via some artificial "packet in" message.

Namely, the S eNB-C needs to get notion about the sequence number and this can either be achieved by an explicit report of only that sequence number (e.g. parameter) in question or via an artificial Packet IN message which carries the sequence number as part of the whole packet to the OFC+/eNB-C. The S eNB-C may search in the "packet-IN message" for the sequence number only, may extract it and may sent it via GTP-C to the T eNB-C, whereas the rest of the packet IN message may be discarded at the S-eNB-C.

Thus, in particular as such it is not needed that the controller would redirect any manipulated packet towards a new destination itself.

However, since the controller already received (the first or) all the packets and the controller is already involved in the procedure, it might use the "packet out" message (which instructs the user plane to sent the packet in the "packet out" message or the packets which have been buffered) to forward the payload to the T eNB-U.

In this regard, it is noted that the "Packet In" message is a message within the OpenFlow which normally reports the receipt of a (unknown) packet for which the user plan does not have a rule/instruction on how to act on this (payload) packet. In that particular case the user plane sends the (unknown) whole packet (or even more) to the controller and also additionally buffers this packet and any subsequent packets, and awaits further instructions from the controller like for instance to send the buffered packets to a particular destination via an outgoing port or to discard them, or whatever the controller might require.

In the foregoing, certain embodiments of the present invention have been described in detail with respect to an OpenFlow protocol. In the following, a more general description of certain embodiments of the present invention is made with respect to FIGS. 7 to 9.

Figure 7:
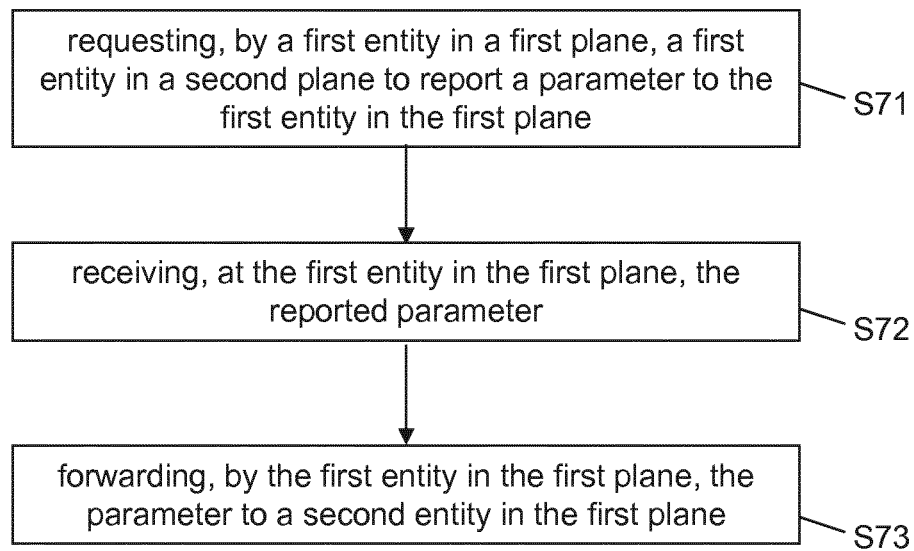
FIG. 7 is a flowchart illustrating an example of a method according to example versions of the present invention.

FIG. 7 is a flowchart illustrating an example of a method according to example versions of the present invention.

According to example versions of the present invention, the method may be implemented in a first entity in a first plane and comprises requesting, in step S71, by a first entity in a first plane, a first entity in a second plane to report a parameter to the first entity in the first plane, receiving, at the first entity in the first plane, the reported parameter in step S72, and forwarding, by the first entity in the first plane, the parameter to a second entity in the first plane in step S73.

According to example versions of the present invention, the method further comprises requesting all packets to be sent to a controller located between the first entity in the first plane and the first entity in the second plane.

According to example versions of the present invention, the method further comprises instructing, by the first entity in the first plane, the first entity in the second plane to redirect data packets sourced from a terminal to a second entity in the second plane.

According to example versions of the present invention, the method further comprises instructing, by the first entity in the first plane, the first entity in the second plane to switch from transmitting data packets directly to a terminal to transmitting the data packets via the second entity in the second plane.

Figure 8:
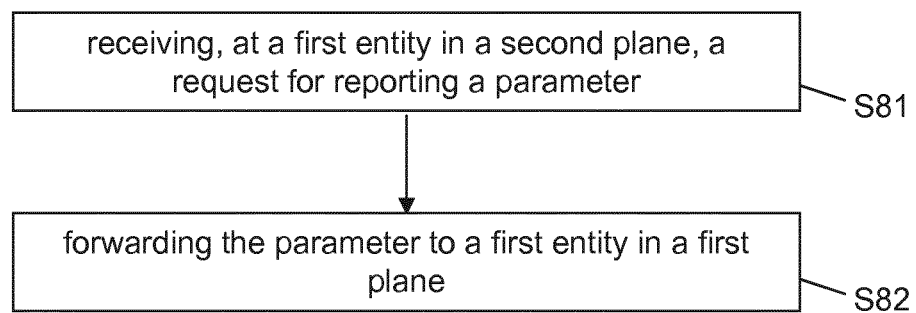
FIG. 8 is a flowchart illustrating another example of a method according to example versions of the present invention.

FIG. 8 is a flowchart illustrating another example of a method according to example versions of the present invention.

According to example versions of the present invention, the method may be implemented in a first entity in a second plane and comprises receiving, at a first entity in a second plane, a request for reporting a parameter in a step S81, and forwarding the parameter to a first entity in a first plane in a step S82.

According to example versions of the present invention, the method further comprises receiving, at the first entity in the second plane, an instruction to redirect data packets from a terminal to a second entity in a second plane, and transmitting uplink packets simultaneously towards a network element and the second entity in the second plane for a predetermined time period, and assigning a parameter to the data packets transmitted to the second entity in the second plane.

According to example versions of the present invention, the method further comprises stopping transmitting uplink data packets to the network element after the certain predetermined time period has elapsed, and stopping assigning the parameter to the data packets transmitted to the second entity in the second plane.

According to example versions of the present invention, the method further comprises reporting, by the first entity in the second plane, to the first entity in the first plane, the first parameter that has not been transmitted to the network element and that has not been inserted into the data packet transmitted to the second entity in the second plane.

According to example versions of the present invention, the method further comprises transmitting, by the first entity in the second plane, all packets to a controller located between the first entity in the first plane and the first entity in the second plane.

According to example versions of the present invention, the method further comprises receiving, at the first entity in the second plane, an instruction from the first entity in the first plane, to switch from transmitting data packets directly to a terminal to transmitting the data packets via a second entity in the second plane, transmitting downlink data packets simultaneously towards the second entity in the second plane and the terminal for a predetermined time period, and assigning a parameter to the data packets transmitted to the second entity in the second plane.

According to example versions of the present invention, the method further comprises stopping transmitting downlink data packets to the terminal after the certain time period has elapsed, and stopping assigning the parameter to the data packets transmitted to the second entity in the second plane.

According to example versions of the present invention, the method further comprises reporting, by the first entity in the second plane, to the first entity in the first plane, the first parameter that has not been transmitted to the terminal and that has not been inserted into the data packet transmitted to the second entity in the second plane.

Figure 9:
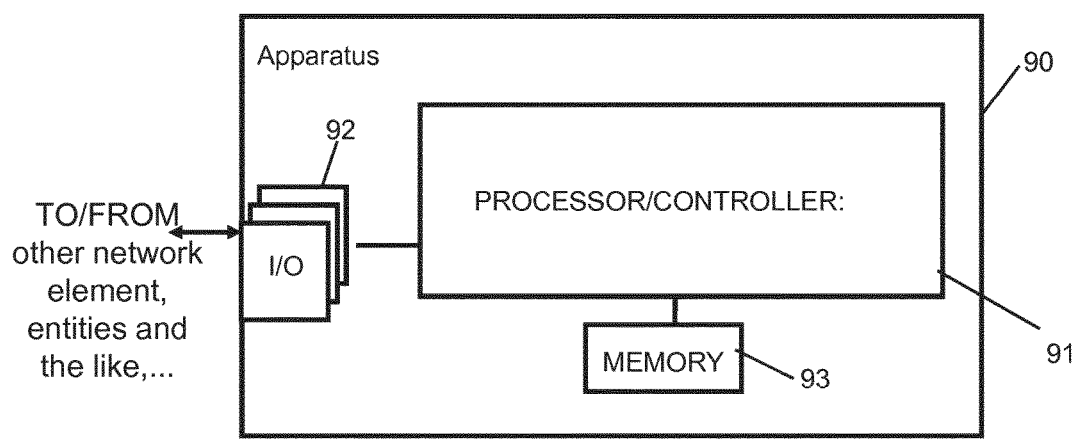
FIG. 9 is a diagram illustrating an example of an apparatus according to example versions of the present invention.

FIG. 9 is a block diagram showing an example of an apparatus according to example versions of the present invention.

In FIG. 9, a block circuit diagram illustrating a configuration of an apparatus 90 is shown, which is configured to implement the above described aspects of the invention. It is to be noted that the apparatus 90 shown in FIG. 9 may comprise several further elements or functions besides those described herein below, which are omitted herein for the sake of simplicity as they are not essential for understanding the invention. Furthermore, the apparatus may be also another device having a similar function, such as a chipset, a chip, a module etc., which can also be part of an apparatus or attached as a separate element to the apparatus, or the like.

The apparatus 90 may comprise a processing function or processor 91, such as a CPU or the like, which executes instructions given by programs or the like related to the flow control mechanism. The processor 91 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 92 denotes transceiver or input/output (I/O) units (interfaces) connected to the processor 91. The I/O units 92 may be used for communicating with one or more other network elements, entities, terminals or the like. The I/O units 92 may be a combined unit comprising communication equipment towards several network elements, or may comprise a distributed structure with a plurality of different interfaces for different network elements. Reference sign 93 denotes a memory usable, for example, for storing data and programs to be executed by the processor 91 and/or as a working storage of the processor 91.

The processor 91 is configured to execute processing related to the above described aspects. In particular, the apparatus 90 may be implemented in or may be part of a first entity in a first plane and may be configured to perform a method as described in connection with FIG. 7. Thus, the processor 91 is configured to perform requesting, by the first entity in the first plane, a first entity in a second plane to report a parameter to the first entity in the first plane, receiving, at the first entity in the first plane, the reported parameter, and forwarding, by the first entity in the first plane, the parameter to a second entity in the first plane.

According to example versions of the present invention, the apparatus 90 may be implemented in or may be part of a first entity in a second plane and may be configured to perform a method as described in connection with FIG. 8. Then, the processor 91 is configured to perform receiving, at the first entity in the second plane, a request for reporting a parameter, and forwarding the parameter to a first entity in a first plane.

Thus, according to example versions of the present invention, there are provided two apparatuses 90, one for the first entity in the first plane and one for the first entity in the second plane, and the apparatuses each have a structure as illustrated in FIG. 9.

According to example versions of the present invention, the first entity in the first plane and the second entity in the first plane are collocated in a common entity including functionality of the first entity in the first plane and functionality of the second entity in the first plane.

According to example versions of the present invention, the first entity is a source entity which initiates a handover and the second entity is a target entity to which the handover is performed.

According to example versions of the present invention, the parameter is a count value.

According to example versions of the present invention, the entity is a base station.

According to example versions of the present invention, the first plane is a control/management plane and the second plane is a user plane.

According to example versions of the present invention, the network element is a network element having gateway functionality, and the terminal is a user equipment, server, application, or gateway.

According to example versions of the present invention, data packets to the user equipment are transmitted according to a packet data convergence protocol and data packets to the gateway or base station are transmitted according to a GTP user data tunneling protocol.

Target eNB

Now, the behavior at the target eNB will be explained according to certain embodiments of the present invention.

Generally, on the target eNB side, it is suggested that the target eNB-C should send the DL and UL Count value to the eNB-U. The eNB-U should store them and should use the values in DL and UL bearer.

Upon receipt of the X2 SN Status transfer message, as shown in FIG. 2, the target eNB-C 64 retrieves the UL/DL count values and sends them with the OpenFlow message "Mod-Flow" in new proprietary parameters towards the eNB-U 66 via the OFC+ 65.

Upon receipt of the OpenFlow message "Mod-Flow" with the new proprietary parameters (UL/DL count value with the corresponding PDCP SN) at the target eNB-U 66, the eNB-U 66 stores the corresponding values.

In the case of downlink, for each bearer for which the DL COUNT Value is received in the OpenFlow message "Flow_Mod", the target eNB-U 66 shall use it to mark, with the value contained in the new proprietary parameter, the first downlink packet for which there is no PDCP SN yet assigned (in the GTP-U). For any following packet, the PDCP SN is incremented.

In the case of uplink, for each bearer for which the UL COUNT Value is received in the OpenFlow message "Flow- _Mod", the target eNB-U 66 shall not deliver any uplink packet (to the SGW) which has a PDCP SN lower than the value contained in the PDCP-SN IE of the UL Count.

The important use case is the support of intra E-UTRAN handover, but the same solution can also be applied to the S1 based handover as well.

The same principles in general can be applied to any other RAN element, like those already known in the past, e.g. BTS, etc and/or the like, as well as those of the future like LTE-A and 5G etc.

Alternatively, for both the uplink and the downlink case at the target eNB-C 64, the eNB-U 66 may forward on request (from the T eNB-C) any packet to the eNB-C 64 via the OFC+ 65, which could inspect the count value and may either forward the packet unmodified back to the eNB-U 66 via the OpenFlow "packet out" (towards the respective destination), or discard the packet.

However, such an alternative solution would have impact on the OpenFlow control channel and the OpenFlow controller and control plane.

In the following, certain embodiments of the present invention will be described in detail with reference to FIGS. 3 to 6.

The packet flow in downlink and uplink in the user plane before the handover is the same as already described above with respect to the source eNB. Hence, reference is made in this regard to FIGS. 3 and 4 and the respective description thereof.

As shown in FIG. 3, in the downlink case, before the handover, the source eNB is forwarding the PDCP packets only to the UE over the LTE-Uu interface.

As shown in FIG. 4, in the uplink case, before the handover, the source eNB is forwarding the GTP packets only to the SGW.

With the receipt of the SN Status Transfer or MME Status Transfer the handover is started at the target eNB-C.

FIG. 5 shows an example of the packet flow in uplink during handover.

Regarding the target eNB-C/OFC+, upon receipt of "SN Status transfer" or "MME STATUS TRANSFER" message, the target eNB-C/OFC+ reports/notifies the SN number to the target eNB-U in the OpenFlow message "AddFlow" or "Modflow". Then, at the target eNB-U, a new OpenFlow comparing procedure and new action is required.

The new match field with the new 'Compare capability' is capable of comparing the content of the PDCP SNs in the GTP-U extension "PDCP PDU Number" with the SN number received via OpenFlow.

If the GTP-U number is equal to or higher than the SN number received via OpenFlow, the packets are forwarded to the SGW. If not then the packets are not sent towards the SGW.

As a new match field, there is proposed reporting/notifying to the controller any following packets, such that the controller is able to discard the packets on its own or forward it to the respective destination with e.g. Packet Out message.

According to current specifications, the OpenFlow actions are only triggered in case of a simple match, i.e. if the GTP-U number matches the SN number.

Thus, there is proposed a new matching procedure/new comparing rules, and the new matching procedure is capable to compare the GTP-U number and the SN number and to reveal whether the GTP-U number is less or higher than the SN number, or to reveal whether the GTP-U number is equal to or less than the SN number, or equal to or higher than the SN number.

Further, some new actions are proposed based on the result of the above described new comparing rules, namely, ignoring or acting/sending.

For example, as described above, if the GTP-U number is equal to or higher than the SN number received via OpenFlow, the packets are forwarded to the SGW. Otherwise, if the GTP-U number is less than the SN number received via OpenFlow the packets are ignored, i.e. not sent towards the SGW.

FIG. 5 illustrates the case for uplink where the target eNB forwards the PDCP PDU from GTP-U (with length and content) towards the SGW.

FIG. 6 shows an example of the packet flow in downlink during handover.

Regarding the target eNB-U, upon receipt of the "SN Status transfer" or "MME STATUS TRANSFER" message, the target eNB-C/OFC+ reports/notifies the SN number to the target eNB-U in the OpenFlow message "AddFlow" or "Modflow". Then, at the target eNB-U, a new OpenFlow comparing procedure and new action is required.

The new match field with the new 'Compare capability' is capable of comparing the content of the PDCP SNs in the GTP-U extension "PDCP PDU Number" with the SN number received via OpenFlow.

If the GTP-U number is equal to or higher than the SN number received via OpenFlow, the packets are forwarded to the UE. If not then the packets are not sent towards the UE.

According to current specifications, as described above, the OpenFlow actions are only triggered in case of a simple match, i.e. if the GTP-U number matches the SN number.

Thus, there is proposed a new matching procedure/new comparing rules, and the new matching procedure is capable to compare the GTP-U number and the SN number and to reveal whether the GTP-U number is less or higher than the SN number, or to reveal whether the GTP-U number is equal to or less than the SN number, or equal to or higher than the SN number.

Further, some new actions are proposed based on the result of the above described new comparing rules, namely, ignoring, and acting/sending.

For example, as described above, the target eNB-U ignores PDCP packets with SN number lower than the SN Number as received via OpenFlow, based on the above comparing rules.

Further, the target eNB-U sends PDCP packets with SN number not lower than the SN Number as received via OpenFlow (and increment the SN number with each PDCP packet) to the UE, based on the above comparing rules.

Thus, according to certain embodiments of the present invention, in downlink, the target eNB pushes the PDCP PDU (from GTP-U) for the PDCP packet towards the UE.

In the foregoing, certain embodiments of the present invention have been described in detail with respect to an OpenFlow protocol. In the following, a more general description of certain embodiments of the present invention is made with respect to FIGS. 10 to 12.

Figure 10:
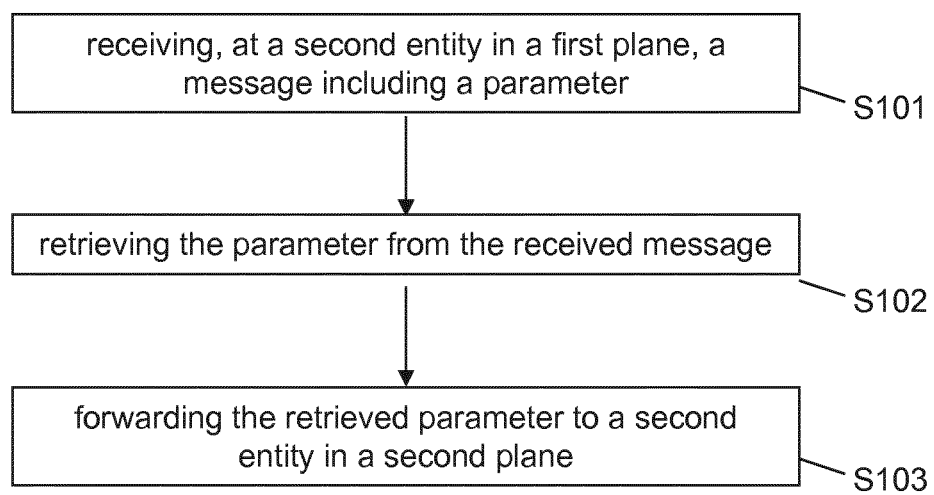
FIG. 10 is a flowchart illustrating another example of a method according to example versions of the present invention.

FIG. 10 is a flowchart illustrating an example of a method according to example versions of the present invention.

According to example versions of the present invention, the method may be implemented in a second entity in a first plane and comprises receiving, at a second entity in a first plane, a message including a parameter in a step S101, retrieving the parameter from the received message in a step S102, and forwarding the retrieved parameter to a second entity in a second plane in a step S103.

Figure 11:
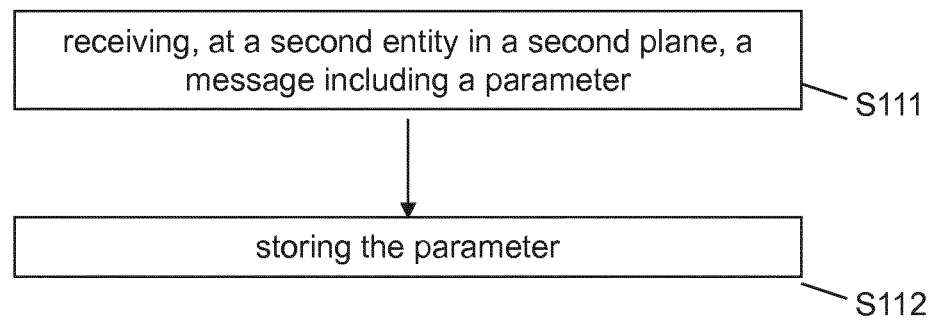
FIG. 11 is a flowchart illustrating another example of a method according to example versions of the present invention.

FIG. 11 is a flowchart illustrating another example of a method according to example versions of the present invention.

According to example versions of the present invention, the method may further be implemented in a second entity in a second plane and comprises receiving, at a second entity in a second plane, a message including a parameter in a step S111, and storing the parameter in a step S112.

According to example versions of the present invention, the method further comprises receiving, at the second entity in the second plane, a data packet to which a parameter is assigned from a first entity in the second plane, and comparing the stored parameter with the parameter assigned to the received data packet.

According to example versions of the present invention, the method further comprises, if it is determined that the parameter assigned to the data packet is equal to or higher than the stored parameter, forwarding the data packet, to which the parameter is assigned, to a network element.

According to example versions of the present invention, the method further comprises, if it is determined that the parameter assigned to the data packet is equal to or higher than the stored parameter, forwarding the data packet, to which the parameter is assigned, to terminal.

According to example versions of the present invention, the method further comprises, if it is determined that the parameter assigned to the data packet is equal to or less than the stored parameter, ignoring the data packet, to which the parameter is assigned.

According to example versions of the present invention, the first entity in first plane and the second entity in first plane are collocated in a common entity including functionality of the first entity in the first plane and functionality of the second entity in the first plane.

According to example versions of the present invention, the first entity is a source entity which initiates a handover and the second entity is a target entity to which the handover is performed.

According to example versions of the present invention, the entity is a base station.

According to example versions of the present invention, the first plane is a control/management plane and the second plane is a user plane.

According to example versions of the present invention, the network element is a network element having a gateway functionality, and the terminal is a user equipment, server, application, or gateway.

According to example versions of the present invention, the parameter is a count value.

According to example versions of the present invention, data packets to the user equipment are transmitted according to a packet data convergence protocol and data packets to the gateway or base station are transmitted according to a GTP user data tunneling protocol.

Figure 12:
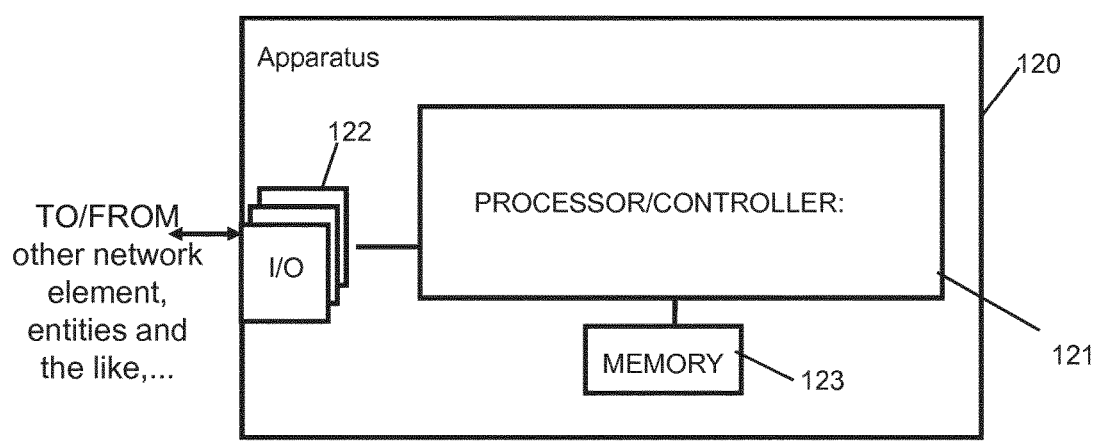
FIG. 12 is a diagram illustrating another example of an apparatus according to example versions of the present invention.

FIG. 12 is a block diagram showing an example of an apparatus according to example versions of the present invention.

In FIG. 12, a block circuit diagram illustrating a configuration of an apparatus 120 is shown, which is configured to implement the above described aspects of the invention. It is to be noted that the apparatus 120 shown in FIG. 12 may comprise several further elements or functions besides those described herein below, which are omitted herein for the sake of simplicity as they are not essential for understanding the invention. Furthermore, the apparatus may be also another device having a similar function, such as a chipset, a chip, a module etc., which can also be part of an apparatus or attached as a separate element to the apparatus, or the like.

The apparatus 120 may comprise a processing function or processor 121, such as a CPU or the like, which executes instructions given by programs or the like related to the flow control mechanism. The processor 121 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 122 denotes transceiver or input/output (I/O) units (interfaces) connected to the processor 121. The I/O units 122 may be used for communicating with one or more other network elements, entities, terminals or the like. The I/O units 122 may be a combined unit comprising communication equipment towards several network elements, or may comprise a distributed structure with a plurality of different interfaces for different network elements. Reference sign 123 denotes a memory usable, for example, for storing data and programs to be executed by the processor 121 and/or as a working storage of the processor 121.

The processor 121 is configured to execute processing related to the above described aspects. In particular, the apparatus 120 may be implemented in or may be part of a second entity in a first plane and may be configured to perform a method as described in connection with FIG. 10. Thus, the processor 121 is configured to perform receiving, at the second entity in the first plane, a message including a parameter, retrieving the parameter from the received message, and forwarding the retrieved parameter to a second entity in a second plane.

According to example versions of the present invention, the apparatus 120 may be implemented in or may be part of a second entity in a second plane and may be configured to perform a method as described in connection with FIG. 11. Thus, the processor 121 is further configured to perform receiving, at the second entity in the second plane, a message including a parameter, and storing the parameter.

Thus, according to example versions of the present invention, there are provided two apparatuses 120, one for the second entity in the first plane and one for the second entity in the second plane, and the apparatuses each have a structure as illustrated in FIG. 12.

According to example versions of the present invention, the first entity in the first plane and the second entity in the first plane are collocated in a common entity including functionality of the first entity in the first plane and functionality of the second entity in the first plane.

According to example versions of the present invention, the first entity is a source entity which initiates a handover and the second entity is a target entity to which the handover is performed.

According to example versions of the present invention, the parameter is a count value.

According to example versions of the present invention, the entity is a base station.

According to example versions of the present invention, the first plane is a control/management plane and the second plane is a user plane.

According to example versions of the present invention, the network element is a network element having a gateway functionality, and the terminal is a user equipment, server, application, or gateway.

According to example versions of the present invention, data packets to the user equipment are transmitted according to a packet data convergence protocol and data packets to the gateway or base station are transmitted according to a GTP user data tunneling protocol.

In the foregoing, certain embodiments of the present invention have been described with reference to OpenFlow. However, it is noted that OpenFlow is just an example and that the present invention is not limited to OpenFlow and that the certain embodiments of the present invention could be applied to any other suitable communication protocol, like e.g. Forces, SNMP, NFV, NetConf, or the like.

Further, it is noted that the present invention is also applicable to further developed networks, like e.g. 5G. In such a case, there is introduced a so called HeNB GW which is a new function inherently comprising functions of the eNB and MME and SGW simultaneously.

Further, it is noted that the source and the target control of the HeNB (Home eNB) (like of course also the normal eNB) can be centralized, as it would be probably beneficial especially in small cell environment, where a centralized OFC (OpenFlow controller) may be provided, possibly co-located at a function or connected to, which is called HeNB GW (Home eNB Gateway) in 3GPP. So the HeNB GW may ride on top of a centralized OFC+, which controls the source and/or target HeNB user planes responsible for (and may be, also additionally the local user plane).

As a further possibility not only the eNB but also the HeNB and HeNB GW (Home eNB Gateway) (cf. TS36300 "Evolved Universal Terrestrial Radio Access (E-UTRA) and Evolved Universal Terrestrial Radio Access Network (E-UTRAN); Overall description) and the HNB (cf. TS 25467 "UTRAN architecture for 3G Home Node B (HNB)") can take advantage of the invention. Similar to the normal eNB the HeNB/HNB can be separated and controlled via means of OpenFlow/SDN/OFC+. This would relieve the existing small cells like the Nokia Solutions and Networks Flexi Lite BTS from implementing the whole 3GPP (control plane) stack like (X2 Control Plane and the GTP-C control plane stack) as simply the User plane only may be deployed where appropriate.

In particular, the small cells HeNB in general behaves like the already described eNB in this regard, but even the HeNB GW as mediator acting as the EPC (MME/SGW) towards the HeNB and simultaneously acting as an eNB towards the EPC (MME/EPC) is e.g. able to apply the invention based on the SDN principles. Also for instance the central HeNB GW may instruct the source and/or the target HeNB or eNB user part to report the count/sequence number or to compare them with the sequence number as received via the GTP-U (instead of relying on the X2 interface "SN transfer"). Furthermore depending on the capabilities (which might be signalled to or configured at the HeNB GW) of the HeNB, the He NB GW control plane may decide to map it from OpenFlow to X2 or S1 and vice versa.

The above described certain embodiments of the present invention are particularly advantageous in that they do not burden the Controller with additional traffic and computation requirements. Hence, the present invention according to certain embodiments can be easily implemented.

In the foregoing exemplary description of the apparatuses, only the units/means that are relevant for understanding the principles of the invention have been described using functional blocks. The apparatus may comprise further units/means that are necessary for its respective operation as network element, like base station, and the like, respectively. However, a description of these units/means is omitted in this specification. The arrangement of the functional blocks of the apparatus is not construed to limit the invention, and the functions may be performed by one block or further split into sub-blocks.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the aspects/embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the aspects/embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the aspects/embodiments and general and specific examples described above are provided for illustrative purposes only and are in no way intended that the present invention is restricted thereto. Rather, it is the intention that all variations and modifications which fall within the scope of the appended claims are covered.

LIST OF ABBREVIATIONS

BTS Base Transceiver Station
CP Control plane
C-RNTI Cell RNTI
DL downlink
eNB evolved Node B
eNB-U eNB user plane
eNB-C eNB control plane
EPC Evolved packet core
E-UTRAN Evolved Universal Terrestrial RAN
Forces: Forwarding and Control element separation
HO Handover
LTE-A LTE Advanced
OF OpenFlow
PDCP packet data convergence protocol
PDU protocol data unit
RACH Random Access Channel
RAN radio access network
RNTI Radio Network Temporary Identifier
RRC Radio Resource Control
SDU Service Data Unit
SDN software defined networking
S eNB Source eNB
SGW Signaling Gateway
SN sequence number
T eNB Target eNB
TNL Transport Network Layer
UL Uplink
UP user plane

The invention claimed is:

1. An apparatus, comprising
at least one processor, and
at least one memory for storing instructions to be executed by the processor, wherein
the at least one memory and the instructions are configured to, with the at least one processor, cause the apparatus at least to perform:
receiving, at a first entity in a second plane, a request for reporting a parameter,
forwarding the parameter to a first entity in a first plane,
receiving, at the first entity in the second plane, an instruction to redirect data packets from a terminal to a second entity in a second plane,
transmitting uplink packets simultaneously towards a network element and the second entity in the second plane for a predetermined time period, and
assigning a parameter to the data packets transmitted to the second entity in the second plane, wherein the second entity is a target entity to which the handover is performed, wherein
the first entity is a source entity which initiates a handover,
the parameter is a count value,
the entity is a base station, and
the first plane is a control/management plane and the second plane is a user plane.

2. The apparatus according to claim 1, further comprising:
stopping transmitting uplink data packets to the network element after the predetermined time period has elapsed, and stopping assigning the parameter to the data packets transmitted to the second entity in the second plane.

3. The apparatus according to claim 1, further comprising:
reporting, at the first entity in the second plane, to the first entity in the first plane, the first parameter that has not been transmitted to the network element and that has not been inserted into the data packet transmitted to the second entity in the second plane.

4. The apparatus according to claim 1, further comprising
transmitting, at the first entity in the second plane, all packets to a controller located between the first entity in the first plane and the first entity in the second plane.

5. An apparatus, comprising
at least one processor, and
at least one memory for storing instructions to be executed by the processor, wherein
the at least one memory and the instructions are configured to, with the at least one processor, cause the apparatus at least to perform:
receiving, at a first entity in a second plane, a request for reporting a parameter, and
forwarding the parameter to a first entity in a first plane,
receiving, at the first entity in the second plane, an instruction from the first entity in the first plane, to switch from transmitting data packets directly to a terminal to transmitting the data packets via a second entity in the second plane,
transmitting downlink data packets simultaneously towards the second entity in the second plane and the terminal for a predetermined time period, and
assigning a parameter to the data packets transmitted to the second entity in the second plane wherein
the first entity is a source entity which initiates a handover,
the parameter is a count value,
the entity is a base station, and
the first plane is a control/management plane and the second plane is a user plane.

6. The apparatus according to claim 5, further comprising:
stopping transmitting downlink data packets to the terminal after the certain time period has elapsed, and stopping assigning the parameter to the data packets transmitted to the second entity in the second plane.

7. The apparatus according to claim 5, further comprising:
reporting, at the first entity in the second plane, to the first entity in the first plane, the first parameter that has not been transmitted to the terminal and that has not been inserted into the data packet transmitted to the second entity in the second plane.

8. A method, comprising:
receiving, at a first entity in a second plane, a request for reporting a parameter,
forwarding the parameter to a first entity in a first plane,
receiving, at the first entity in the second plane, an instruction to redirect data packets from a terminal to a second entity in a second plane,
transmitting uplink packets simultaneously towards a network element and the second entity in the second plane for a predetermined time period, and
assigning a parameter to the data packets transmitted to the second entity in the second plane, wherein the second entity is a target entity to which the handover is performed, wherein
the first entity is a source entity which initiates a handover,
the parameter is a count value,
the entity is a base station, and
the first plane is a control/management plane and the second plane is a user plane.

9. The method according to claim 8, further comprising:
stopping transmitting uplink data packets to the network element after the predetermined time period has elapsed, and stopping assigning the parameter to the data packets transmitted to the second entity in the second plane.

10. The method according to claim 8, further comprising:
reporting, at the first entity in the second plane, to the first entity in the first plane, the first parameter that has not been transmitted to the network element and that has not been inserted into the data packet transmitted to the second entity in the second plane.

11. The apparatus according to claim 8, further comprising
transmitting, at the first entity in the second plane, all packets to a controller located between the first entity in the first plane and the first entity in the second plane.

12. A method, comprising:
receiving, at a first entity in a second plane, a request for reporting a parameter, and
forwarding the parameter to a first entity in a first plane,
receiving, at the first entity in the second plane, an instruction from the first entity in the first plane, to switch from transmitting data packets directly to a terminal to transmitting the data packets via a second entity in the second plane,
transmitting downlink data packets simultaneously towards the second entity in the second plane and the terminal for a predetermined time period, and assigning a parameter to the data packets transmitted to the second entity in the second plane
wherein
the first entity is a source entity which initiates a handover,
the parameter is a count value,
the entity is a base station, and
the first plane is a control/management plane and the second plane is a user plane.

13. The method according to claim 12, further comprising:
stopping transmitting downlink data packets to the terminal after the certain time period has elapsed, and stopping assigning the parameter to the data packets transmitted to the second entity in the second plane.

14. The method according to claim 12, further comprising:
reporting, at the first entity in the second plane, to the first entity in the first plane, the first parameter that has not been transmitted to the terminal and that has not been inserted into the data packet transmitted to the second entity in the second plane.

15. A non-transitory computer readable medium storing a computer program, when executed by a processor, causes the processor to:
receive, at a first entity in a second plane, a request for reporting a parameter,
forward the parameter to a first entity in a first plane,
receive, at the first entity in the second plane, an instruction to redirect data packets from a terminal to a second entity in a second plane,
transmit uplink packets simultaneously towards a network element and the second entity in the second plane for a predetermined time period, and
assign a parameter to the data packets transmitted to the second entity in the second plane, wherein the second entity is a target entity to which the handover is performed, wherein
the first entity is a source entity which initiates a handover,
the parameter is a count value, the entity is a base station, and
the first plane is a control/management plane and the second plane is a user plane.

16. The non-transitory computer readable medium according to claim 15, wherein the computer program, when executed by the processor, further causes the processor to
stop transmitting uplink data packets to the network element after the predetermined time period has elapsed, and stopping assigning the parameter to the data packets transmitted to the second entity in the second plane.

17. The non-transitory computer readable medium according to claim 15, wherein the computer program, when executed by the processor, further causes the processor to
report, at the first entity in the second plane, to the first entity in the first plane, the first parameter that has not been transmitted to the network element and that has not been inserted into the data packet transmitted to the second entity in the second plane.

18. A non-transitory computer readable medium storing a computer program, when executed by a processor, causes the processor to:
receive, at a first entity in a second plane, a request for reporting a parameter, and
forward the parameter to a first entity in a first plane, receive, at the first entity in the second plane, an instruction from the first entity in the first plane, to switch from transmitting data packets directly to a terminal to transmitting the data packets via a second entity in the second plane, transmit downlink data packets simultaneously towards the second entity in the second plane and the terminal for a predetermined time period, and assign a parameter to the data packets transmitted to the second entity in the second plane, wherein the first entity is a source entity which initiates a handover, the parameter is a count value, the entity is a base station, and the first plane is a control/management plane and the second plane is a user plane.

19. The non-transitory computer readable medium according to claim 18, wherein the computer program, when executed by the processor, further causes the processor to stop transmitting downlink data packets to the terminal after the certain time period has elapsed, and stopping assigning the parameter to the data packets transmitted to the second entity in the second plane.

20. The non-transitory computer readable medium according to claim 18, wherein the computer program, when executed by the processor, further causes the processor to report, at the first entity in the second plane, to the first entity in the first plane, the first parameter that has not been transmitted to the terminal and that has not been inserted into the data packet transmitted to the second entity in the second plane.

\* \* \* \* \*